United States Patent
Almeter

(10) Patent No.: US 9,365,262 B1
(45) Date of Patent: Jun. 14, 2016

(54) WIGGLE HULL DESIGN HAVING A CONCAVE AND CONVEX PLANING HULL

(71) Applicant: John Almeter, Chesapeake, VA (US)

(72) Inventor: John Almeter, Chesapeake, VA (US)

(73) Assignee: The United States of America as represented by the Secretary of The Navy, Washington, DC (US)

(*) Notice: Subject to any disclaimer, the term of this patent is extended or adjusted under 35 U.S.C. 154(b) by 0 days.

(21) Appl. No.: 14/735,542

(22) Filed: Jun. 10, 2015

(51) Int. Cl.
*B63B 1/00* (2006.01)
*B63B 1/34* (2006.01)
*B63B 1/18* (2006.01)

(52) U.S. Cl.
CPC .... *B63B 1/34* (2013.01); *B63B 1/18* (2013.01)

(58) Field of Classification Search
CPC ............. B63B 1/00; B63B 1/16; B63B 1/18; B63B 1/20; B63B 1/32; B63B 1/34; B63B 1/40; B63B 2001/00; B63B 2001/16; B63B 2001/20; B63B 2001/32; B63B 2001/34
USPC ................ 114/271, 283, 288, 290, 291, 56.1, 114/61.26, 61.27, 61.29, 61.3, 61.31, 61.32, 114/62, 63, 142
See application file for complete search history.

(56) References Cited

U.S. PATENT DOCUMENTS

| | | | | |
|---|---|---|---|---|
| 2,915,031 A * | 12/1959 | Johnston | ................... | B63B 1/20 114/271 |
| 3,225,729 A * | 12/1965 | Ewing, Jr. | ................. | B63B 1/20 114/271 |
| 5,129,343 A | 7/1992 | Giles | | |
| 5,645,003 A | 7/1997 | Grinde | | |
| 6,176,196 B1 | 1/2001 | Halter | | |
| 6,415,731 B2 | 7/2002 | Chrunyk | | |
| 6,957,619 B2 | 10/2005 | Reynolds | | |
| 8,726,823 B2 | 5/2014 | Kristinsson | | |
| 2003/0145774 A1* | 8/2003 | Coates | ...................... | B63B 3/18 114/65 R |
| 2008/0216729 A1* | 9/2008 | Chauveau | ................. | B63B 1/20 114/39.25 |
| 2010/0037810 A1* | 2/2010 | McLoughlin | .......... | B63B 1/042 114/274 |

FOREIGN PATENT DOCUMENTS

DE  WO 2007048389 A1 *  5/2007  ............. B63B 1/042

* cited by examiner

*Primary Examiner* — Daniel V Venne
(74) *Attorney, Agent, or Firm* — Dave A. Ghatt

(57) ABSTRACT

A Wiggle Hull design for a water vessel, the hull design including a planing hull segment. The planing hull segment has a longitudinal camber that is a combination of concave and convex undersurfaces for improving performance characteristics, including lift and lift to drag ratios. The Wiggle Hull design may also have end plates at the chines to optimize performance characteristics.

5 Claims, 4 Drawing Sheets

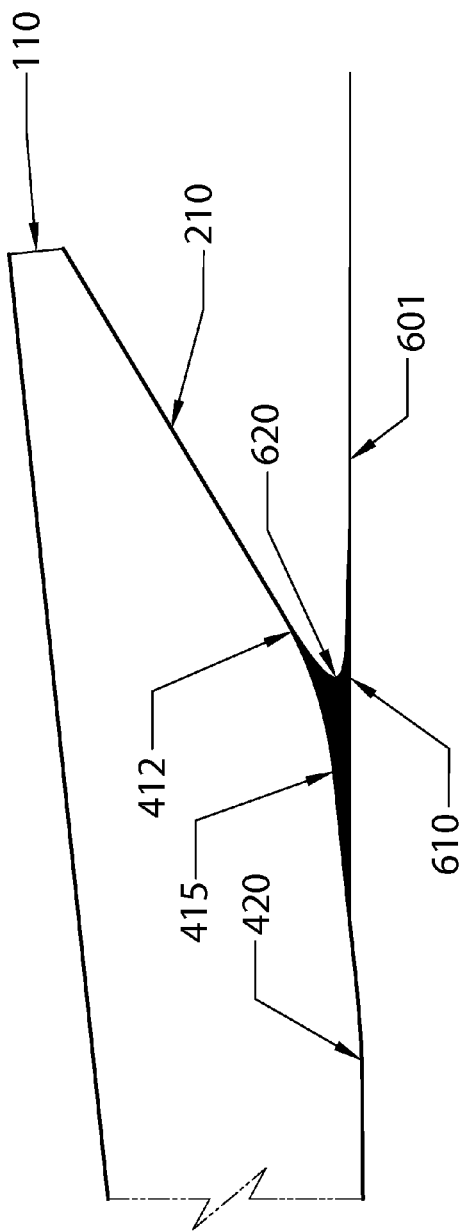

WIGGLE HULL DESIGN HAVING A CONCAVE AND CONVEX PLANING HULL

STATEMENT OF GOVERNMENT INTEREST

The following description was made in the performance of official duties by employees of the Department of the Navy, and thus, the claimed invention may be manufactured, used, licensed by or for the United States Government for governmental purposes without the payment of any royalties thereon.

TECHNICAL FIELD

The following description relates generally to a wiggle hull segment for a water vessel, the wiggle hull segment having a longitudinal camber that is a combination of concave and convex undersurfaces for improving performance characteristics, including lift and lift to drag ratios.

BACKGROUND

Planing lift is generated when a planing surface imparts a downward momentum to the free surface of the water below. This action is manifested as a downward depression of the water surface behind the planing surface. In water vessels, the planing surface is generally the bottom of the planing hull.

Planing hulls generally use a hull with straight buttocks, with the exception of the areas near the bow and at the transom for trim tabs or wedges. FIG. 1 is an exemplary illustration of a planing hull, according to what is known in the prior art. FIG. 1 shows a water vessel 10, having a planing hull 11, which as shown is generally straight and flat. FIG. 1 depicts the water vessel 10 as it moves along a water surface 50, the planing hull 11 imparting an upward force L on the water surface 50 to counter the weight, W, on the water surface 50. As shown, a downward depression 55 is created behind the planing surface 11. FIG. 1 also shows the drag D and the resulting force R.

This type of hull is not an ideal lift surface and its resistance at high loads is poor. This results in high drag D, and high propulsion power fuel requirements, resulting in poor fuel economy. The traditional planing hull, especially those heavily loaded, have very high hump drag that can prevent them from getting past hump speed. Thus, there is a need for a planing hull design that improves performance characteristics.

SUMMARY

In one aspect, the invention is a water vessel for operation in open water. In this aspect, the water vessel includes a hull having a bow end and a stern end. The hull also has a planing hull segment having a planing hull undersurface for contacting the water. The planing segment has a plurality of lateral profiles in a lateral extension direction X and a longitudinal profile in a longitudinal extension direction Y perpendicular to the lateral extension direction X. In this aspect, each of the plurality of lateral profiles in the lateral extension direction X includes a flat portion extending substantially parallel to the direction X. The plurality of lateral profiles defines a flat-bottomed lateral section. The longitudinal profile in the longitudinal extension direction Y includes an inclined portion, a transition knuckle, a substantially flat horizontal portion, a first convex transition knuckle, a first concave portion, a second convex transition knuckle, and a second concave portion. According to the invention, starting from the bow end, the longitudinal profile includes the inclined portion extending downwards at a constant angle α. The inclined portion ends at the transition knuckle, which extends into the substantially flat horizontal portion. This is followed by the first convex transition knuckle located between the substantially flat horizontal portion and the first concave portion. According to the invention, the first concave portion is aft of the first convex transition knuckle, with the first concave portion ending at the second convex transition knuckle, and wherein the second concave portion is aft of the second convex transition knuckle. The second concave portion extends towards the stern end of the hull.

In another aspect, the invention is a planing hull segment of a water vessel having a bow end and a stern end. The planing hull segment has a planing hull undersurface for contacting the water. The planing segment has a plurality of lateral profiles in a lateral extension direction X and a longitudinal profile in a longitudinal extension direction Y perpendicular to the lateral extension direction X. In this aspect, each of the plurality of lateral profiles in the lateral extension direction X includes a flat portion extending substantially parallel to the direction X. The plurality of lateral profiles defines a flat-bottomed lateral section. The longitudinal profile in the longitudinal extension direction Y includes, an inclined portion, a transition point to a flat horizontal surface, a transition point from the horizontal surface to the first concave portion, a first concave portion, a second convex transition point, and a second concave portion. According to the invention, starting from the bow end, the longitudinal profile includes the inclined portion extending downwards at a constant angle α. The inclined portion ends at the transition knuckle, which extends into the substantially flat horizontal portion. This is followed by the first convex transition knuckle located between the substantially flat horizontal portion and the first concave portion. According to the invention, the first concave portion is aft of the first convex transition knuckle, with the first concave portion ending at the second convex transition knuckle, and wherein the second concave portion is aft of the second convex transition knuckle. The second concave portion extends towards the stern end of the hull.

BRIEF DESCRIPTION OF THE DRAWINGS

Other features will be apparent from the description, the drawings, and the claims.

FIG. 6 is an exemplary centerline view of a watercraft planing hull segment, showing the water impacting the Wiggle Hull while planing, according to an embodiment of the invention.

FIG. 7 is an exemplary sectional view showing vertical end plates on a Wiggle Hull, according to an embodiment of the invention.

DETAILED DESCRIPTION

Figure 2:
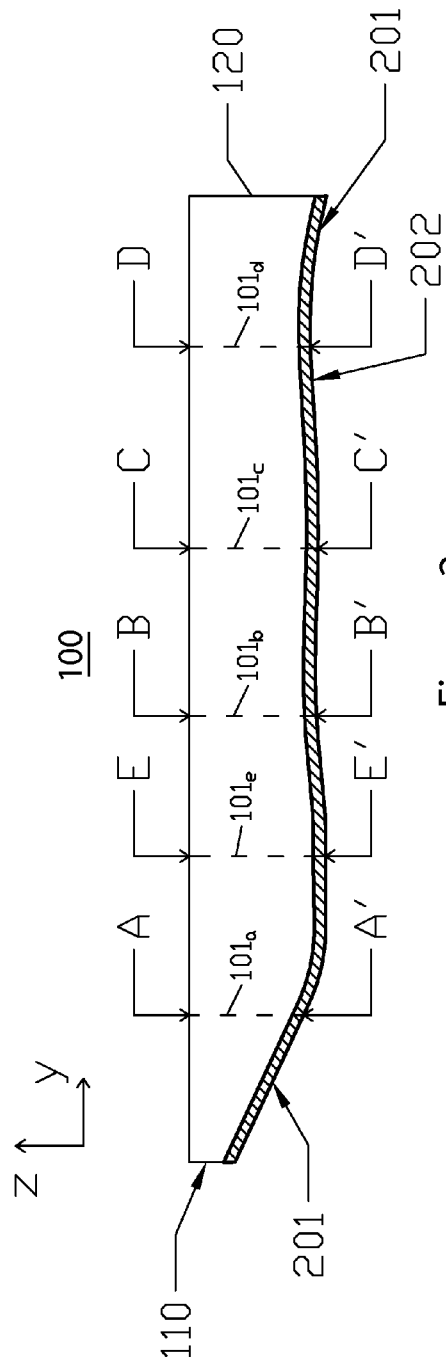
FIG. 2 is an exemplary side view of a watercraft having a hull with a planing hull segment, according to an embodiment of the invention.

FIG. 2 is an exemplary side view of a watercraft 100 having a hull 101 with a planing hull segment 201, according to an embodiment of the invention. According to the invention, the watercraft 100 may be an amphibious vehicle, a landing craft, a bridge erection boat, a gun boat, an armored troop carrier, a workboat, a knee board or the like. According to the invention, the watercraft 100 has the capability to operate at or about hump speed. As outlined below, the planing hull segment 201 is a concave/convex Wiggle Hull that provides higher lift and higher lift to drag ratios than traditional planing hulls, especially for heavily loaded planing hulls at moderate planing speeds. The concave/convex Wiggle Hull design is also more efficient at hump speed. This allows the watercraft 100 to carry more weight for the same installed power, to operate with less power, and to consume less fuel. The Wiggle Hull design of the planing hull segment 201 also has lower dynamic trim.

As stated above, FIG. 2 is a side view showing the overall structure of the watercraft 100 having a hull 101. As shown, FIG. 2 represents a side view in the Y-Z plane. The hull includes a bow end 110 and a stern end 120. FIG. 2 also shows that the hull 101 includes a planing hull segment 201, illustrated by cross-hatches. The planing hull segment 201 extends between the bow end 110 and the stern end 120. The concave/convex Wiggle Hull structure of the planing hull segment 201 is outlined below. The planing hull segment 201 has a planing surface 202, the underside of the hull segment 201. When the watercraft 100 is planing at typical planing speeds, watercraft 100 planes on hull segment 201.

Figure 3:
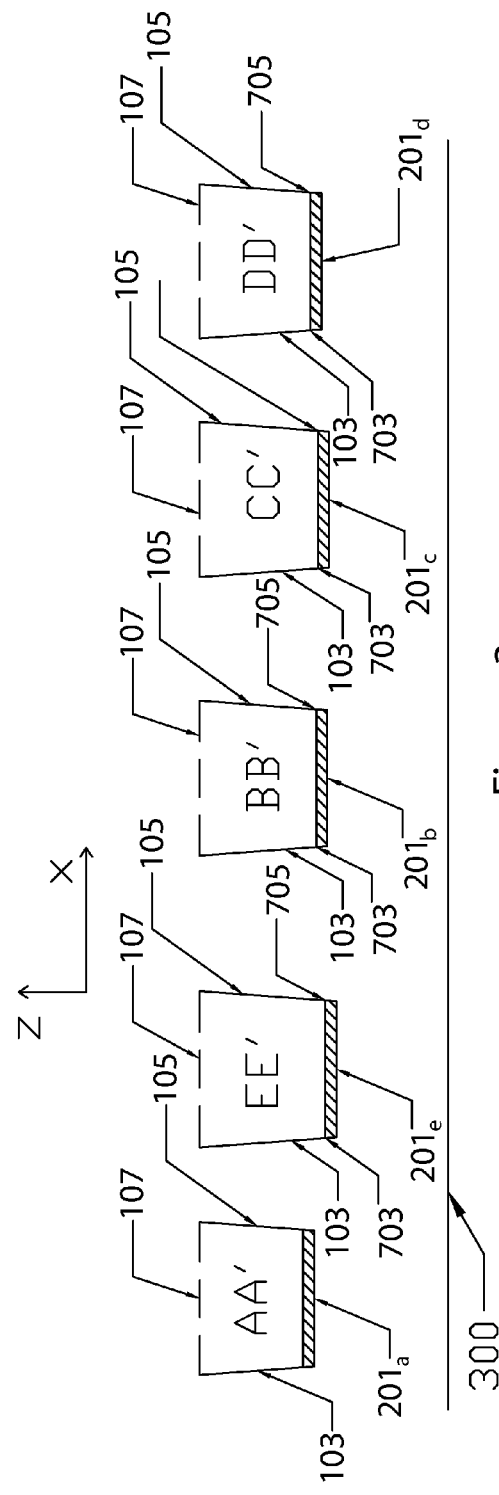
FIG. 3 is a sectional illustration of views AA', EE', BB', CC', and DD' through A-A', E-E', B-B', C-C', and D-D' in FIG. 2, according to an embodiment of the invention.

FIG. 3 is a sectional illustration of views AA', EE', BB', CC', and DD' through A-A', E-E', B-B', C-C', and D-D' in FIG. 2, according to an embodiment of the invention. The views AA', EE', BB', CC', and DD' represents sectional slices through the hull 101 at locations $101_a$, $101_e$, $101_b$, $101_c$, and $101_d$ along the watercraft hull 101. As shown, the sectional views are oriented in the X-Z plane. The sectional views of FIG. 3 show the watercraft hull 101 having hull side walls 103 (portside) and 105 (starboard). The sections may or may not have a top deck 107, depending on the design of the watercraft 100. The FIG. 3 views AA', EE', BB', CC', and DD' also show respective sectionals $201_a$, $201_e$, $201_b$, $201_c$, and $201_d$ of the planing hull segment 201.

Figure 4:
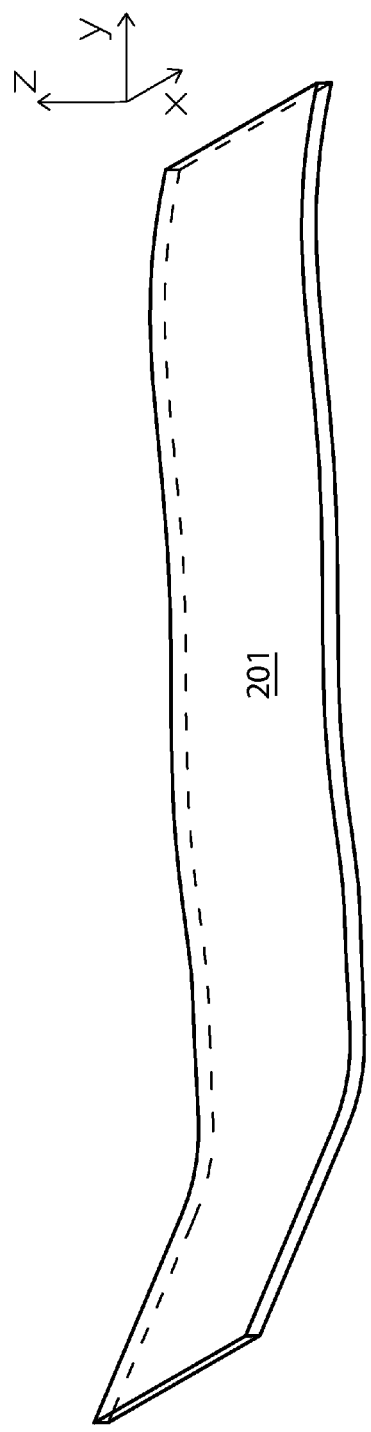
FIG. 4, which is a perspective illustration of planing hull segment, showing how the planing hull segment extends in the lateral X-direction and the longitudinal Y-direction, with respect to an overall XYZ coordinate system, according to an embodiment of the invention.

As shown, the planing hull segments $201_a$, $201_e$, $201_b$, $201_c$, and $201_d$ have a lateral extension in the X-direction. As a path is traced for the respective planing hull segments $201_a$, $201_e$, $201_b$, $201_c$, and $201_d$ in the lateral X-direction from one hull side wall 103 to the other hull side wall 105, with respect to the X-Z plane, there is no variation in the Z-direction. In other words, with respect to lateral extension in the X-Z plane, the Z-direction coordinate is constant. This therefore defines a flat-bottomed lateral section. This can also be seen in FIG. 4, which is a perspective illustration of planing hull segment 201, showing how the planing hull segment 201 extends in the lateral X-direction and the longitudinal Y-direction, with respect to an overall XYZ coordinate system.

It should be noted that the lengths of the walls 103 and 105 may be different, depending on the location of the section. Similarly, the length in the X-direction of the respective sectionals $201_a$, $201_e$, $201_b$, $201_c$, and $201_d$, depending on the lateral width at that particular hull 101. However, the shape in the lateral X-direction is primarily flat regardless of the position along the hull 101. FIG. 3 also shows a reference line 300 shows the relative positions of the sectionals $201_a$, $201_e$, $201_b$, $201_c$, and $201_d$, with respect to each other, depth-wise.

It should also be noted that FIG. 3 represents sectional views of five randomly selected points along the hull 101. The hull 101 is made up of a plurality of these sectionals, not shown. Thus the planing hull segment 201 itself has a plurality of lateral profiles in the laterally extending direction X. These sectionals all have similar shapes as outlined in FIG. 3. Therefore, each of the plurality lateral profiles in the lateral extension direction X has comprises a flat portion extending substantially parallel to the X direction. Thus, the combined plurality of lateral profiles defines a flat-bottomed lateral section of the hull.

Returning to FIG. 2, the planing hull segment 201 extends in longitudinal extension direction Y, perpendicular to each of the lateral extension X-direction and the vertical Z-direction extension. (See FIG. 4.) As shown in FIG. 2, this extension in the Y-direction is between the bow end 110 and the stern end 120. As a path is traced in longitudinal extension direction Y, from the bow end 110 to the stern end 120, with respect to the Y-Z plane, there is some variation in the Z-direction. Again, this can also be seen in FIG. 4, which is a perspective illustration of planing hull segment 201, showing how the planing hull segment 201 extends in the lateral X-direction and the longitudinal Y-direction, with respect to an overall XYZ coordinate system.

Figure 5:
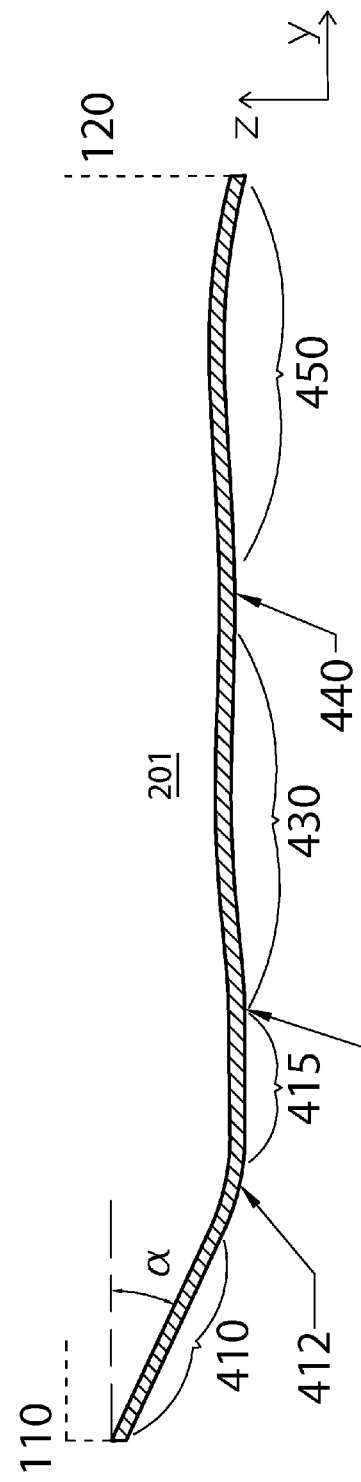
FIG. 5 is an exemplary side view of a watercraft planing hull segment, showing the Wiggle Hull concave/convex profile, according to an embodiment of the invention.

FIG. 5 is an exemplary side view of a watercraft planing hull segment 201, showing the Wiggle Hull concave/convex profile in the longitudinal direction Y i.e., the longitudinal camber, according to an embodiment of the invention. Following the longitudinal profile/longitudinal camber in a bow-to-stern direction, starting at the bow end 110, the planing hull segment 201 is inclined downwards at a constant angle α portion. According to an embodiment of the invention, the constant angle α may be an angle of about 10 degrees to about 30 degrees. This is shown as inclined portion 410. The inclined portion 410 ends at a transition knuckle/point 412 where a substantially flat horizontal portion 415 starts. The substantially flat horizontal portion 415 is a planing surface. At the end of the substantially flat horizontal portion 415, there is a transition knuckle/point 420 where there is convexity transitioning into a first concave portion 430. As illustrated, at the first convex transition knuckle 420, the longitudinal camber transitions from the substantially flat horizontal portion 415 to a first concave portion 430. The first concave portion 430 ends at a second convex transition knuckle/point 440. Aft of the second convex transition knuckle 440 is a second concave portion 450. As illustrated, at the second convex transition knuckle 440, the longitudinal camber transitions from the first concave portion 430 to the second concave portion 450. The second concave portion 450 extends into the stern end 120 of the hull 101.

According to an embodiment of the invention, the first and second concave portions 430 and 450 have a positive camber ratio between 1% and 6%. According to an embodiment of the invention, the camber ratio is approximately 2.5%. It should be noted that the illustration of FIG. 5 may provide an exaggerated view of the different portions watercraft planing hull segment 201, solely as a means to describe the different elements of the planing hull segment 201. However, the camber ratios as outlined above are suggested values according to embodiments of the invention.

Figure 1:
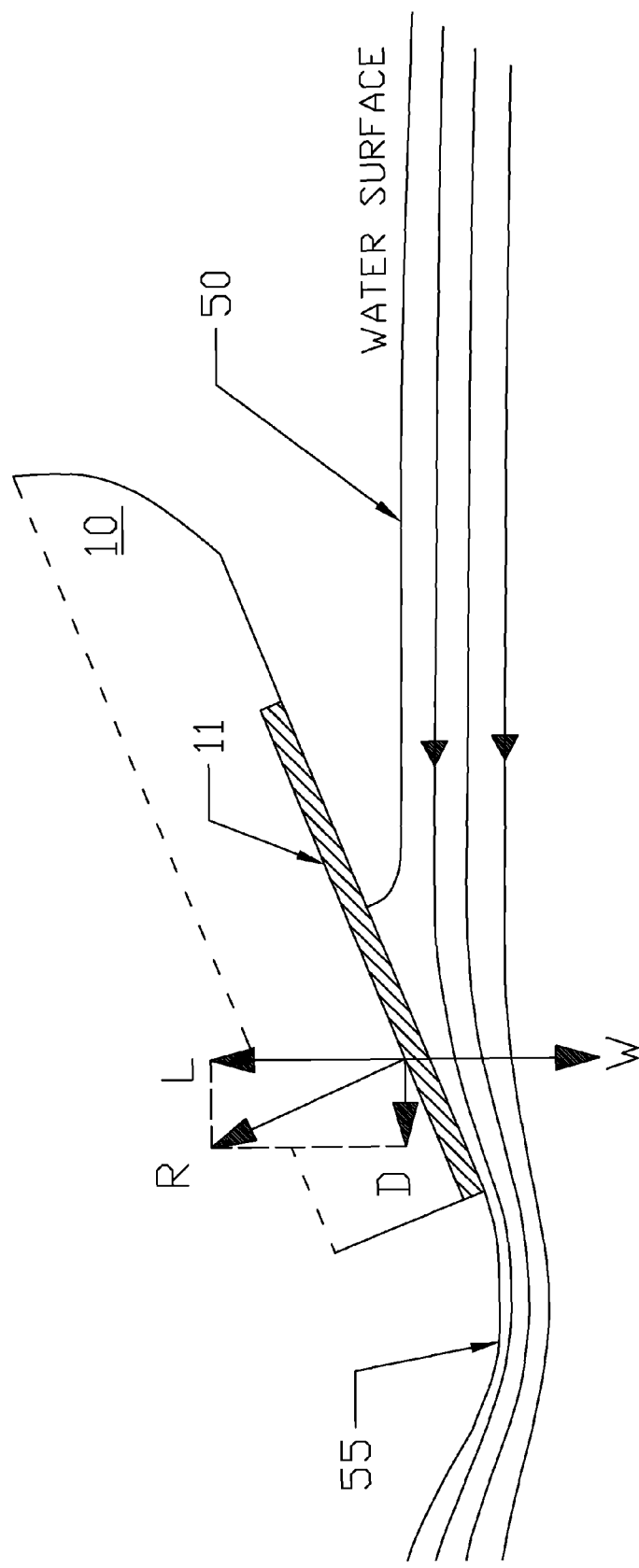
FIG. 1 is an exemplary illustration of a watercraft having a hull with a planing hull segment, according to what is known in the prior art.

As stated above, the watercraft 100 may be an amphibious vehicle, a landing craft, a bridge erection boat, a gun boat, an armored troop carrier, a workboat, a knee board or the like. According to the invention, the watercraft 100 has the capability to operate at or about hump speed. FIG. 6 is an exemplary centerline view of a watercraft planing hull segment 201, showing the water impacting the Wiggle Hull while planing, according to an embodiment of the invention. In operation, when planing, a spray root 610 or start of wetted length starts near or aft of the knuckle 412 and on the flat horizontal surface 415. This is shown in FIG. 6. FIG. 6 also shows a water pileup 620 above the still waterline 601 common to planing hulls. The combination of concavity and convexity of the undersurface 202 lowers the resistance and increases lift to drag, as compared to the traditional planing hull shown in FIG. 1. During transition from displacement to planing and during normal motions from operation in waves, the sloped bow inclined portion 410, forward of the flat horizontal surface 415 will become wet and provide additional lift for the transition from displacement to planing, dynamic stability and seakeeping. At planing speeds in calm or still water the Wiggle Hull 101 will plane as depicted in FIG. 6.

Also during operation in waves, the spray root 610 may move aft of transition knuckle 420. The second transition convex knuckle 440 of the hull 101 provides dynamic stability in this scenario. It should be noted that the concavity or convexity may be adjusted to optimize performance to suit displacement, longitudinal center of gravity, length to beam ratio and speed.

FIG. 7 is an exemplary sectional view showing vertical end plates 710 on a Wiggle Hull, according to an embodiment of the invention. As shown, vertical end plates 710 may be used. FIG. 7 shows the vertical end plates 710 extending vertically downward at port and starboard chines 705 and 703 defined by the intersection of the hull sides (103, 105) and the planing hull segment 201. (See FIG. 3). The vertical end plates 710 increase the effective aspect ratio and thus generate lift and can decrease drag. It should be noted that the vertical end plates extend longitudinally in direction Y, and may run from the transom 120 up to knuckle 412 or to any intermediate point from the transom to optimize hydrodynamic performance. The depth of the vertical end plates 710 can be varied to optimize hydrodynamic performance. The vertical end plates 710 have the same impact as making the water vessel wider, thereby providing more lift area.

What has been described and illustrated herein are preferred embodiments of the invention along with some variations. The terms, descriptions and figures used herein are set forth by way of illustration only and are not meant as limitations. For example, the concavity or convexity can be adjusted to optimize performance to suit displacement, longitudinal center of gravity, length to beam ratio and speed. Those skilled in the art will recognize that many variations are possible within the spirit and scope of the invention, which is intended to be defined by the following claims and their equivalents, in which all terms are meant in their broadest reasonable sense unless otherwise indicated.

What is claimed is:

1. A water vessel for operation in open water, the water vessel comprising:
 a hull having a bow end and a stern end, the hull comprising:
  a planing hull segment having a planing hull undersurface for contacting the water, the planing hull segment having a plurality of lateral profiles in a lateral extension direction X and a longitudinal profile in a longitudinal extension direction Y perpendicular to the lateral extension direction X,
  wherein each of the plurality of lateral profiles in said lateral extension direction X comprise, a flat portion extending substantially parallel to said direction X, the plurality of lateral profiles defining a flat-bottomed lateral section, and
  wherein the longitudinal profile in said longitudinal extension direction Y comprises:
   an inclined portion;
   a transition knuckle;
   a substantially flat horizontal portion;
   a first convex transition knuckle;
   a first concave portion;
   a second convex transition knuckle; and
   a second concave portion,
  wherein starting from the bow end, the longitudinal profile comprises the inclined portion extending downwards at a constant angle α, the inclined portion ending at the transition knuckle, which extends into the substantially flat horizontal portion, followed by the first convex transition knuckle located between the substantially flat horizontal portion and the first concave portion, and wherein the first concave portion is aft of the first convex transition knuckle, the first concave portion ending at the second convex transition knuckle, and wherein the second concave portion is aft of the second convex transition knuckle, the second concave portion extending towards the stern end of the hull.

2. The water vessel of claim 1, further comprising:
 portside and starboard chines defined by the intersection of the hull sides and the planing hull segment;
 a first end plate; and
 a second end plate, wherein the first and second end plates extend downwards in a vertical Z-direction at the starboard and portside chines, respectively.

3. The water vessel of claim 2, wherein each of the first concave portion and the second concave portion have a positive chamber ratio of about 1% to about 6%.

4. A planing hull segment of a water vessel having a bow end and a stern end, the planing hull segment having a planing hull undersurface for contacting the water, the planing hull segment having a plurality of lateral profiles in a lateral extension direction X and a longitudinal profile in a longitudinal extension direction Y perpendicular to the lateral extension direction X,
 wherein each of the plurality of lateral profiles in said lateral extension direction X comprise, a flat portion extending substantially parallel to said direction X, the plurality of lateral profiles defining a flat-bottomed lateral section, and
 wherein the longitudinal profile in said longitudinal extension direction Y comprises:
  an inclined portion;
  a transition knuckle;
  a substantially flat horizontal portion;
  a first convex transition knuckle;
  a first concave portion;
  a second convex transition knuckle; and
  a second concave portion,
 wherein starting from said bow end, the longitudinal profile comprises the inclined portion extending downwards at a constant angle α, the inclined portion ending at the transition knuckle, which extends into the substantially flat horizontal portion, followed by the first convex transition knuckle located between the substantially flat horizontal portion and the first concave portion, and wherein the first concave portion is aft of the first convex transition knuckle, the first concave portion ending at the second convex transition knuckle, and wherein the second concave portion is aft of the second convex transition knuckle, the second concave portion extending towards said stern end of said hull.

5. The planing hull segment of claim 4, wherein each of the first concave portion and the second concave portion have a positive chamber ratio of about 1% to about 6%.

* * * * *